Nov. 3, 1953 C. B. EVENSON 2,657,904
HYDRAULIC WEDGE
Filed Aug. 25, 1949 2 Sheets-Sheet 1
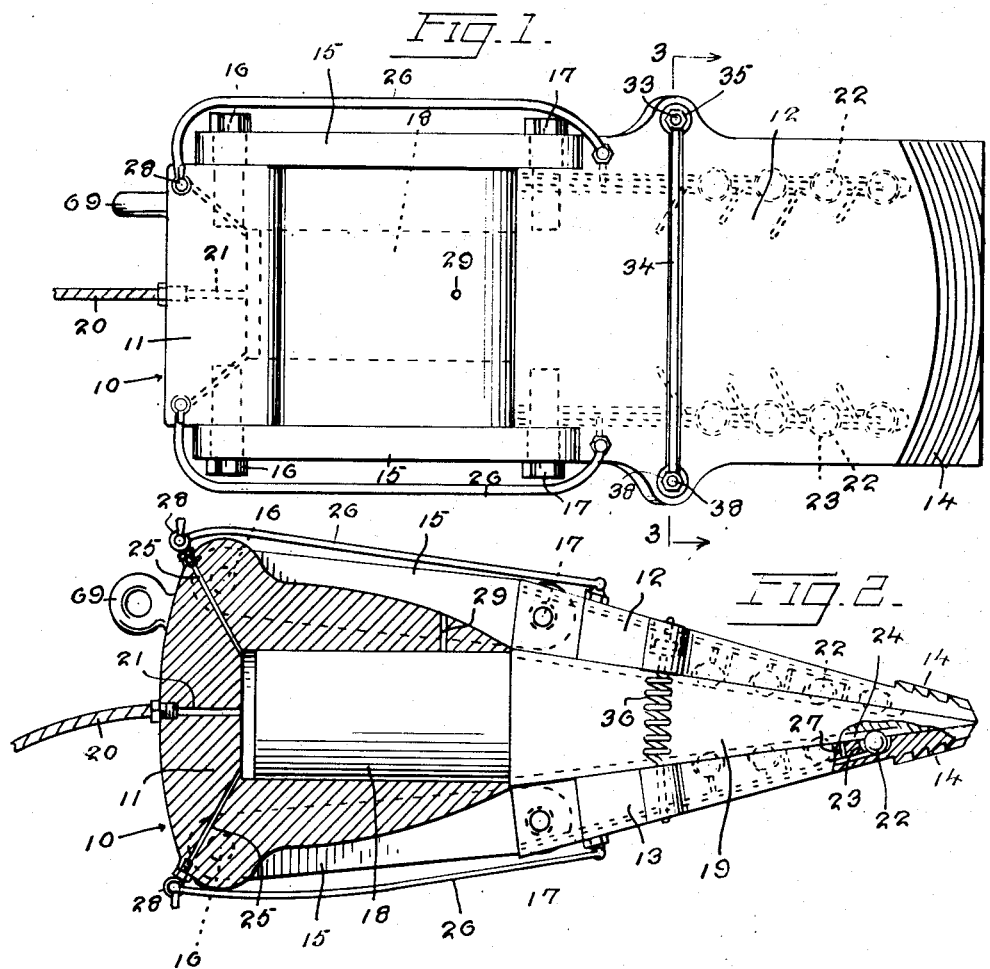
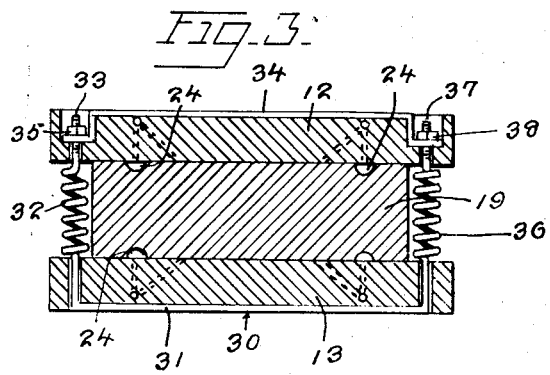
INVENTOR.
Christopher B. Evenson
BY Victor J. Evans & Co.
ATTORNEYS Nov. 3, 1953     C. B. EVENSON     2,657,904
HYDRAULIC WEDGE
Filed Aug. 25, 1949     2 Sheets-Sheet 2
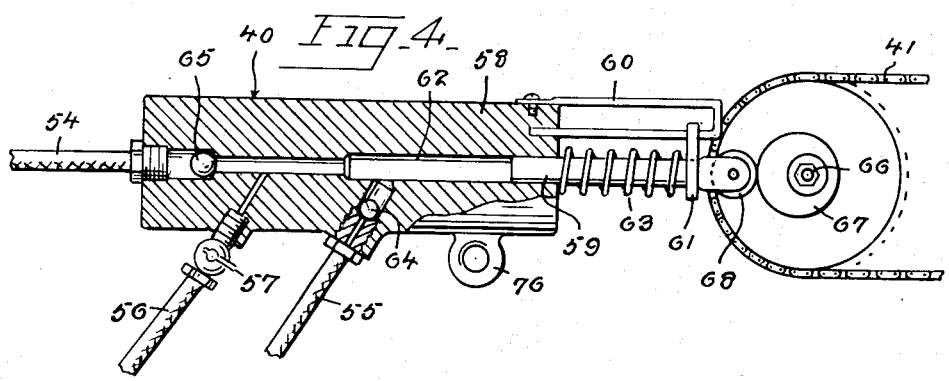
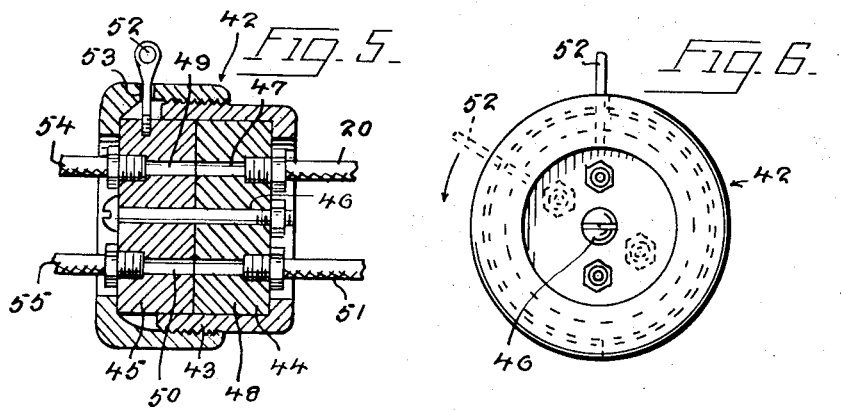
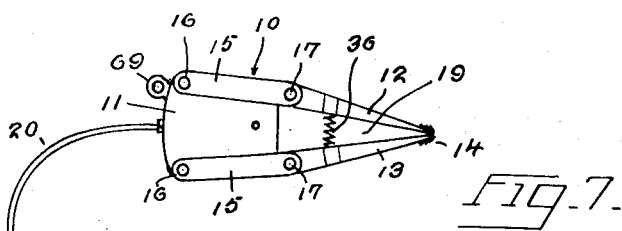
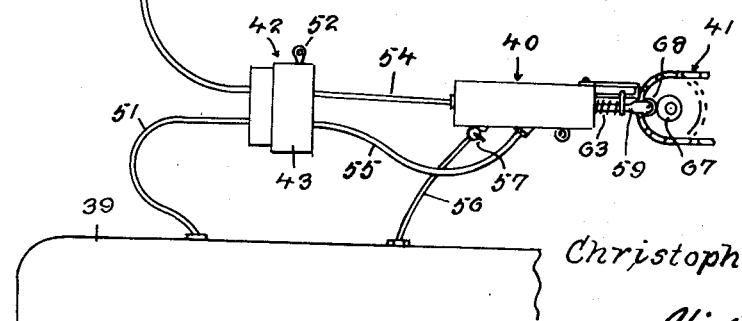
INVENTOR.
Christopher B. Evenson
BY Victor J. Evans & Co.
ATTORNEYS Patented Nov. 3, 1953

2,657,904

UNITED STATES PATENT OFFICE 2,657,904

HYDRAULIC WEDGE

Christopher Brady Evenson, Cottage Grove, Oreg.

Application August 25, 1949, Serial No. 112,393

2 Claims. (Cl. 254—104)

This invention relates to a hydraulic wedge, and more particularly to a hydraulic wedge adapted to be used in felling heavy trees.

The object of the invention is to provide a hydraulic wedge which is adapted to be actuated by a power chain saw and wherein the wedge serves to prevent the saw from being pinched during the cutting of timber.

Another object of the invention is to provide a hydraulically operated wedge wherein a manually operable means is provided for regulating the movement of the wedge, the wedge being strong and efficient in its operation.

A further object of the invention is to provide a hydraulic wedge which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the wedge, according to the present invention;

Figure 2 is a side elevational view of the wedge, with parts broken away and in section;

Figure 3 is a sectional view taken on the line 3—3 of Figure 1;

Figure 4 is a side elevational view of the pump, with parts broken away and in section;

Figure 5 is a longitudinal sectional view taken through the valve for controlling the flow of fluid to the wedge;

Figure 6 is an end elevational view of the valve shown in Figure 5;

Figure 7 is a side elevational view showing the assembled wedge unit ready for use.

Referring in detail to the drawings, there is shown a hydraulically operated wedge assembly which includes a wedge unit 10. The wedge unit 10 includes a cylinder 11 that has a pair of body members 12 and 13 connected thereto. Each of the body members 12 and 13 is provided with a plurality of teeth 14 on its front end whereby the body members 12 and 13 will not accidentally slip out of a cut in a tree or the like when the device is being used.

For pivotally connecting the body members 12 and 13 to the cylinder 11, a pair of bars 15 are arranged on the side of the cylinder 11. One end of the bars 15 is connected to the cylinder 11 by bolts or pins 16, while the other end of the bars 15 is pivotally connected to the body members 12 and 13 by suitable headed pins 17.

Mounted for reciprocatory movement in the cylinder 11 is a piston 18 and secured to the front end of the piston 18 is a triangular shaped wedge 19 which is mounted for sliding movement between the body members 12 and 13. Thus, upon actuation of the piston 18, the wedge 19 will move to thereby selectively spread the body members 12 and 13. A flexible conduit 20 serves to convey hydraulic fluid from a source of supply into a passageway 21 which leads to the interior of the cylinder 11, Figure 2, and this hydraulic fluid serves to actuate the piston 18. Further, a means is provided for insuring that proper lubrication is provided between the wedge 19 and the body members 12 and 13. Thus, a plurality of ball bearings 22 are positioned in sockets 23 in the body members 12 and 13, a portion of the ball bearings 22 projecting into passageways 24 in the wedge 19. A passageway 25 serves to convey hydraulic fluid from the interior of the cylinder 11 to a conduit 26 which in turn communicates with the passageway 24 in the wedge 19 and the conduit 26 also communicates with passageways 27 in the body members 12 and 13. It is to be noted that there are a plurality of the passageways 25 and 27 so that lubricating fluid is conveyed to all necessary moving parts of the wedge unit. A valve 28 is interposed between the passageway 25 and the conduit 26 for controlling the flow of lubricating fluid therethrough.

The cylinder 11 is provided with an overflow port 29 whereby in the event that a piston 18 moves too far forwardly in cylinder 11, a portion of the hydraulic fluid will pass out through the overflow port 29 to warn the operator and prevent movement of the piston 18 completely out of the cylinder 11.

A means is provided for normally urging body members 12 and 13 toward each other. This means is shown in detail in Figure 3, and includes a clamp 30 which is provided with a support member 31 that is arranged in engagement with the body member 13. The support member 31 is provided with a pair of spring legs 32 and 36. The leg 32 terminates in a threaded portion 33 which projects through an opening in the body member 12, and a bracket 34 is arranged in engagement with the portion 33 of the leg 32. A nut 35 is arranged in engagement with the portion 33 for maintaining the parts in assembled relation. Similarly, the other coil spring leg 36 terminates in a threaded portion 37 which projects through an opening in the body member 12, and the other end of the bracket 34 is arranged in engagement with the portion 37 of the leg 36. A nut 38 serves to maintain these parts in assembled relation. Thus, it will be seen that the construction of the clamp 30 permits the body members 12 and 13 to separate or spread apart as the wedge 19 is moved therebetween, since the clamp 30 includes spring legs 32 and 36. Normally, the clamp 30 urges the body members 12 and 13 toward each other.

Referring to Figure 7, there is shown the assembled hydraulic wedge unit which is ready for use. This assembled unit includes a tank 39 which is adapted to contain hydraulic fluid therein. A pump 40 is adapted to transfer hydraulic fluid from the tank 39 to the cylinder 11, and the pump 40 is actuated by a saw 41 as described later in this application. For controlling the flow of hydraulic fluid through the conduits, a valve assembly 42 is provided and this valve assembly is described in detail later in this application.

The manually operable valve 42, Figure 5, includes a housing 43 that has a base 44 immovably mounted therein. Also arranged in the housing 43 is a movable block 45. A bolt and nut assembly 46 pivotally connects the block 45 to the base 44, and a pair of bores 47 and 48 are arranged in the base 44. The conduit 20 communicates with the bore 47 while a flexible conduit 51 connects the bore 48 to the tank 39.

The movable block 45 is provided with a pair of bores 49 and 50 which are adapted to be moved into and out of registry with the bores 47 and 48 in the base 44 so that the flow of hydraulic fluid to the wedge units can be controlled as desired. A hand lever 52 projects through a slot 53 in the housing 43 and into engagement with the block 45 for rotating or moving the latter. A conduit 54, which is flexible, connects the bore 49 to the pump 40, and a flexible conduit 55 connects the bore 50 to the pump 40 as later described in this application. A conduit 56 connects the tank 39 to the pump 40, there being a manually operable valve 57 interposed in the line 56 for controlling the flow of fluid therethrough.

For transferring hydraulic fluid to and from the wedge unit 10, a pump 40 is provided, and the pump 40 includes a casing 58 which has a chamber 62 arranged centrally therein. A plunger 59 is slidably mounted in the chamber 62, and the plunger 59 is maintained in alignment or guided by a bearing 61 which is supported by a bracket 60, the bracket 60 being secured to the casing 58, Figure 4. A coil spring 63 is circumposed on the plunger 59 for normally urging the plunger 59 into its outermost position. A check valve 64 is arranged in the casing 58 for preventing hydraulic fluid from passing from said pump 40 back through the line or conduit 55. A check valve 65 is also arranged in the end of the casing 58 for preventing hydraulic fluid from accidentally passing from the conduit 54 back into the pump 40.

The pump 40 is adapted to be actuated by a power driven chain saw 41. The saw assembly 41 includes a rotatable driven shaft 66 that has mounted thereon a cam 67, and the cam 67 is arranged in engagement with a roller 68 that is mounted on the end of the plunger 59. Thus, upon actuation of the chain 41, the cam 67 will rotate to thereby reciprocate the plunger 59 in the chamber 62 so that hydraulic fluid can be forced to and from the wedge unit 10.

Projecting from the cylinder 11 of the wedge unit 10 and secured thereto, or formed integral with the pair of eye bolts 69 and 70 which are used when the wedge unit is to be supported from a supporting structure.

The operation of the device is as follows:

When it is desired to fell a large tree, a face cut is made in the tree by means of a suitable saw. It is well known that during the sawing of trees, the parts of the tree tend to bind on the saw whereupon further movement of the saw is prevented. Thus, by means of the present invention, the upper and lower parts of the tree can be maintained separated or spread apart sufficiently so that binding of the saw blade will be prevented. Thus, after the face cut in the tree has been made, the wedge unit 10 is positioned therein, and with the valve 42 in the position shown in Figure 7, hydraulic fluid will be forced into the cylinder 11 by the pump 40. The pump 40 is adapted to be actuated by the cam 67 on the saw assembly 41 and thus, hydraulic fluid will be drawn from the tank 39 through the conduit 51, then through the valve 43, and through the conduit 55. This hydraulic fluid then passes through the pump 40, out through the conduit 54, and then into the cylinder 11 by means of the conduit 20. As the hydraulic fluid enters the cylinder 11, the piston 18 will be moved or forced outwardly to thereby start to eject the wedge 19 whereupon the body members 12 and 13 will be spread to separate the portion of the tree being felled. By reversing the block 45 by means of the hand lever 52, the flow of fluid can be reversed in the conduit so that the piston 18 and wedge 19 can be retracted inwardly into the cylinder 11 whereupon the resiliency of the clamp 30 will cause the body member 12 and the body member 13 to move toward each other in the position shown in Figure 2.

The wedge unit of the present invention is durable, and efficient in operation. The wedge unit 10 is constructed so that ample lubrication is provided between the moving parts by means of the ball bearing 22 and the conduits 26 which serve to convey lubricating or hydraulic fluid to the space between the wedge and body members 12 and 13.

What I claim:

1. In a hydraulically operated wedge unit, a cylinder, a pair of body members mounted for movement toward and away from each other, a plurality of spaced parallel bars pivotally connecting said body members to said cylinder at one end thereof, each of said body members being provided with a plurality of teeth on its front end, a piston reciprocably arranged in said cylinder, a triangularly-shaped wedge secured to the front of said piston and slidably positioned between said body members and adapted to extend outwardly of said cylinder intermediate of the pivotal connections of said body members to said parallel bars, a flexible conduit for conveying hydraulic fluid from a source of supply to the interior of said cylinder, means for conveying hydraulic fluid from the interior of said cylinder to and between said wedge and body members for insuring proper lubrication therebetween, valve means for controlling the last-named flow of hydraulic fluid, there being an overflow port in said cylinder, and resilient means for normally urging said body members toward each other.

2. In a hydraulically operated wedge unit, a cylinder, a pair of body members mounted for movement towards and away from each other, a plurality of bars pivotally connecting said body members to said cylinder, each of said body members being provided with a plurality of teeth on its front end, a piston reciprocably arranged in said cylinder, a wedge secured to the front of said piston and slidably positioned between said body members, conduit means for conveying hydraulic fluid from a source of supply to the interior of said cylinder, means for conveying hydraulic fluid from the interior of said cylinder to and between said wedge and body members for insuring proper lubrication therebetween, valve means for controlling the last named flow of hydraulic fluid, there being an overflow port in said cylinder, and resilient means for normally urging said body members towards each other.

CHRISTOPHER BRADY EVENSON.

References Cited in the file of this patent

UNITED STATES PATENTS

| Number | Name | Date |
| --- | --- | --- |
| 443,581 | Marshall | Dec. 30, 1890 |
| 1,556,584 | Breeden | Oct. 13, 1925 |
| 1,932,584 | Hensen | Oct. 31, 1933 |
| 2,341,278 | Long | Feb. 8, 1944 |
| 2,385,753 | Young | Sept. 25, 1945 |
| 2,497,836 | Miller | Feb. 14, 1950 |
| 2,505,847 | Anuszkiewicz | May 2, 1950 |